US009092199B2

(12) United States Patent
Tanaka

(10) Patent No.: US 9,092,199 B2
(45) Date of Patent: Jul. 28, 2015

(54) INFORMATION PROCESSING APPARATUS

(75) Inventor: Soichi Tanaka, Kanagawa (JP)

(73) Assignee: SONY CORPORATION, Tokyo (JP)

(*) Notice: Subject to any disclaimer, the term of this patent is extended or adjusted under 35 U.S.C. 154(b) by 397 days.

(21) Appl. No.: 13/158,807

(22) Filed: Jun. 13, 2011

(65) Prior Publication Data

US 2012/0026095 A1   Feb. 2, 2012

(30) Foreign Application Priority Data

Jul. 29, 2010  (JP) ................................. 2010-170113

(51) Int. Cl.
G06F 3/02    (2006.01)
H05K 7/00    (2006.01)
G06F 1/18    (2006.01)
G06F 1/16    (2006.01)

(52) U.S. Cl.
CPC .............. *G06F 1/181* (2013.01); *G06F 1/1615* (2013.01)

(58) Field of Classification Search
USPC ......... 361/679.01, 730, 752, 0.02, 0.09, 0.21, 361/0.26, 0.27; 349/23
See application file for complete search history.

(56) References Cited

U.S. PATENT DOCUMENTS

| 2,563,191 | A | * | 8/1951 | Russ ........................... 250/462.1 |
| 3,647,279 | A | * | 3/1972 | Sharpless et al. ............... 349/23 |
| 4,989,956 | A | * | 2/1991 | Wu et al. ......................... 349/71 |
| 6,494,593 | B2 | * | 12/2002 | An et al. ........................ 362/235 |
| 6,977,808 | B2 | * | 12/2005 | Lam et al. ................. 361/679.24 |
| 7,440,264 | B2 | * | 10/2008 | Lam et al. ................. 361/679.27 |
| 2005/0007645 | A1 | * | 1/2005 | Tonar et al. ................... 359/265 |
| 2005/0270734 | A1 | * | 12/2005 | Lam et al. ..................... 361/681 |
| 2013/0147715 | A1 | * | 6/2013 | Nakamura .................... 345/168 |

OTHER PUBLICATIONS

U.S. Appl. No. 13/188,742, filed Jul. 22, 2011, Tanaka, et al.

* cited by examiner

*Primary Examiner* — Jayprakash N Gandhi
*Assistant Examiner* — Mukund G Patel
(74) *Attorney, Agent, or Firm* — Oblon, McClelland, Maier & Neustadt, L.L.P.

(57) ABSTRACT

An information processing apparatus includes a display panel unit and a top plate. The display panel unit has a first surface with a display screen and a second surface opposed to the first surface. The top plate has a third surface in contact with the second surface, a fourth surface opposed to the third surface, and a fifth surface connecting an end portion of the third surface and an end portion of the fourth surface, the top plate containing a fluorescent dye to collect light toward the fifth surface.

5 Claims, 11 Drawing Sheets

INFORMATION PROCESSING APPARATUS

BACKGROUND

The present disclosure relates to an information processing apparatus.

In recent years, the importance of design is growing in information processing apparatuses such as a personal computer, a mobile terminal, and an electronic book apparatus. For example, regarding a casing, a high-quality texture can be given thereto, in addition to the shape thereof, by painting an inner side of a top plate formed of an acrylic transparent resin to cause a color to stand out and providing a pattern for irregular reflection to a front surface thereof.

Further, there is also known a structure in which a panel constituting a part of a casing emits light. For example, a light guide body is used as the panel. In the structure, a light source such as an LED (light emitting diode) is provided inside a device and the light from the light source is propagated to the panel of the light guide body. On a rear surface of the panel, patterns such as logos are printed in white color, and light propagated along the panel of the light guide body is partially reflected on the printed portion so as to be output to the front side of the panel. As a result, there is obtained such an illumination effect that the patterns such as logos are profiled on the front surface of the panel, and the improvement in aesthetic appearance of the device can be expected (see, for example, Japanese Patent Application Laid-open No. 2004-326901 (paragraph [0029], FIG. 3; hereinafter, referred to as Patent Document 1)).

SUMMARY

Various conditions to bring out the appearance of an information processing apparatus include color, light, a texture of a front surface, and so on. When the structure in which light is effectively used is adopted, the number of manufacturing steps therefor such as painting and surface processing is increased and costs are increased at the same time. For example, in the case where a light guide plate is adopted as seen in Patent Document 1 or the like, it is necessary to provide a light source in an information processing apparatus, which increases the number of components and power consumption and is inadequate particularly for an apparatus that operates using a battery.

In view of the circumstances as described above, it is desirable to provide an information processing apparatus capable of improving designability with use of light without increasing the number of steps in manufacturing or the number of components.

According to an embodiment of the present disclosure, there is provided an information processing apparatus including a display panel unit and a top plate. The display panel unit has a first surface with a display screen and a second surface opposed to the first surface. The top plate has a third surface in contact with the second surface, a fourth surface opposed to the third surface, and a fifth surface connecting an end portion of the third surface and an end portion of the fourth surface, the top plate containing a fluorescent dye to collect light toward the fifth surface.

In the information processing apparatus, since the top plate contains the fluorescent dye to collect light, natural light or artificial light is collected on the fourth surface and induced to the fifth surface while undergoing the total reflection to be output in a condensed state, with the result that the fifth surface is seen as if to emit light. Therefore, by using a material obtained by containing the fluorescent dye to collect light in the top plate of the information processing apparatus, it is possible to improve designability with use of light without increasing the number of steps in manufacturing or the number of components.

In the information processing apparatus, the top plate may include a first concave portion representing a first mark on the third surface.

With this structure, in the information processing apparatus, as in the case of the fifth surface, it is possible to effectively make the first mark stand out while saving costs for attachment of a seal or printing for representing the first mark by inducing the light to the first concave portion. The first concave portion may be integrally formed by a mold at a time of molding of the top plate, or formed by engraving. Here, the mark refers to a character, figure, symbol, or combination thereof, and is typically a trademark used for the information processing apparatus.

Further, the top plate may include a second concave portion representing a second mark on the fourth surface.

With this structure, in the information processing apparatus, by forming the concave portions on the third surface and the fourth surface of the top plate, it is possible to differentiate between the third surface and the fourth surface in visual performance of the mark, thus enhancing user's interests in design more. Here, the second mark may be identical to the first mark or may be different therefrom.

According to another embodiment of the present disclosure, there is provided an information processing apparatus including a main body unit and a plate. The main body unit has a first surface provided with a keyboard. The plate has a second surface in contact with the first surface, a third surface opposed to the second surface, a fourth surface connecting an end portion of the second surface and an end portion of the third surface, and a hole that passes through the second surface and the third surface and exposes the keyboard, the plate containing a fluorescent dye to collect light.

The information processing apparatus may further include a touchpad set to be in contact with the second surface.

In the information processing apparatus, the plate may include a groove indicating a setting position of the touchpad on the second surface.

In the information processing apparatus, the plate may have a thickness that is gradually reduced as a distance from the fourth surface becomes larger.

As described above, according to the embodiments of the present disclosure, it is possible to improve designability with use of light without increasing the number of steps in manufacturing or the number of components.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings. In this embodiment, a laptop personal computer (hereinafter, referred to simply as PC) is exemplified as an information processing apparatus.

[Structure of PC]

Figure 1:
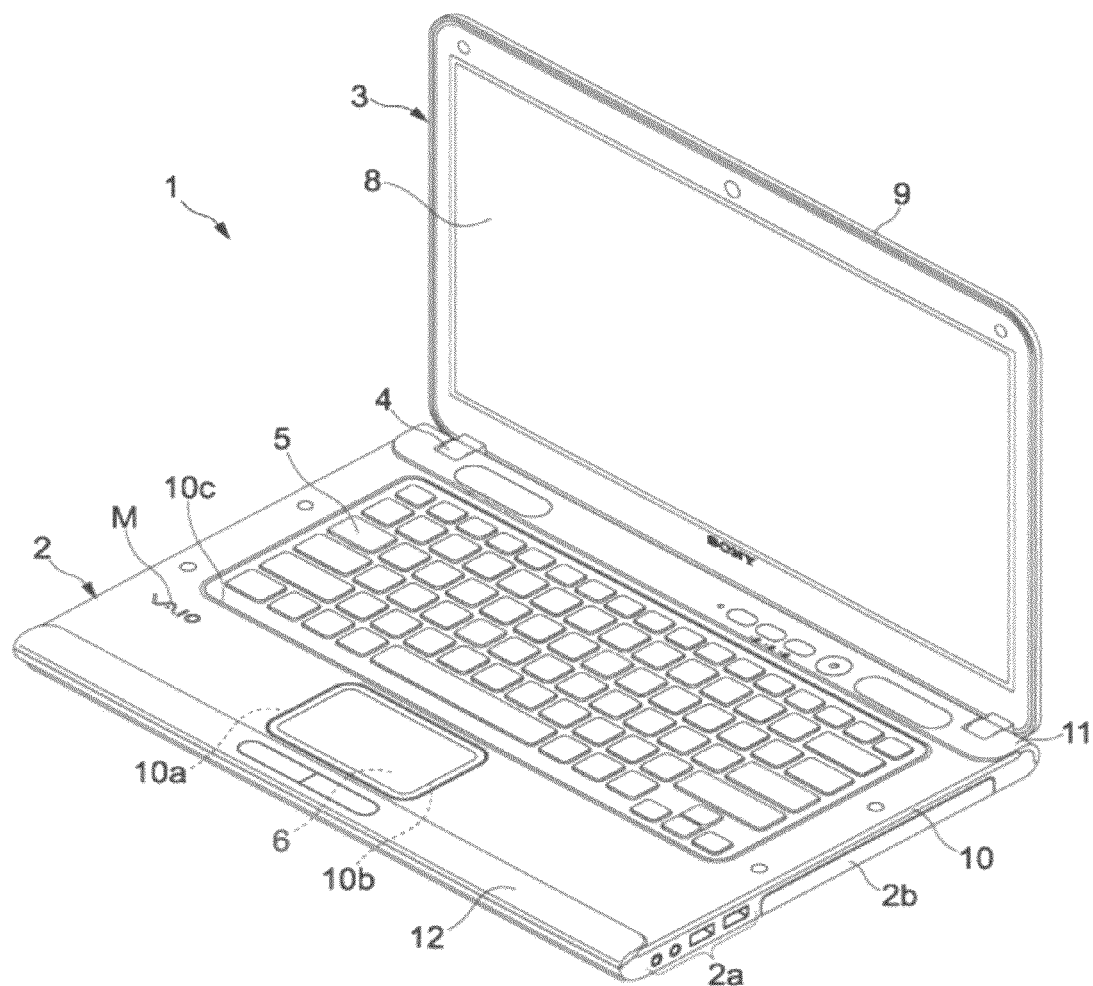
FIG. 1 is a perspective view showing an opened state of a display unit of a PC according to an embodiment of the present disclosure.
Figure 2:
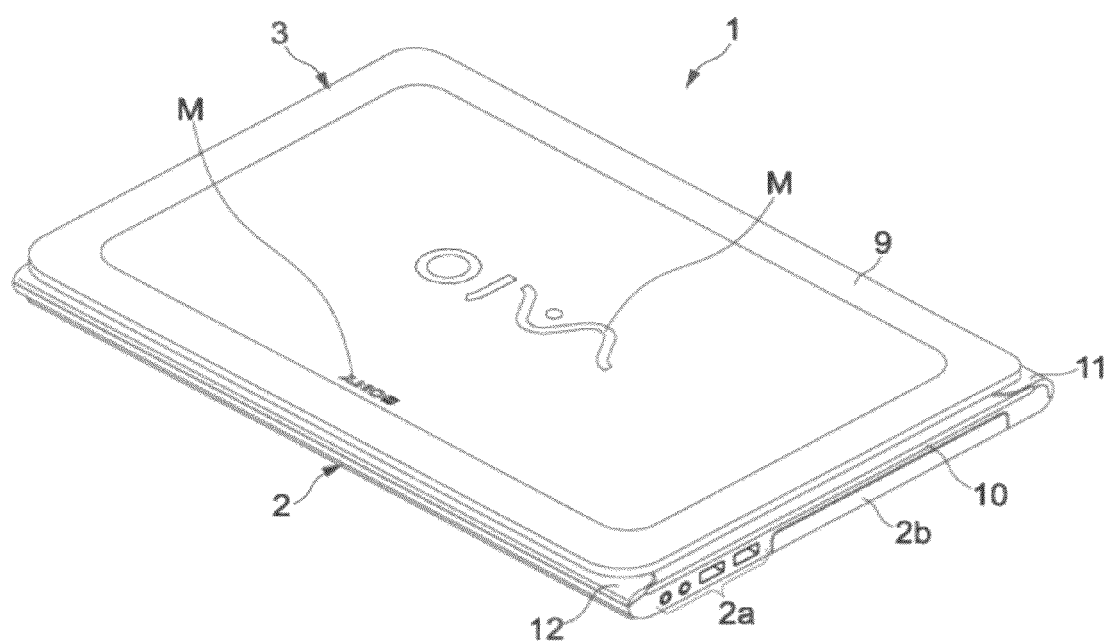
FIG. 2 is a perspective view showing a closed state of the display unit of the PC according to the embodiment of the present disclosure.
Figure 3:
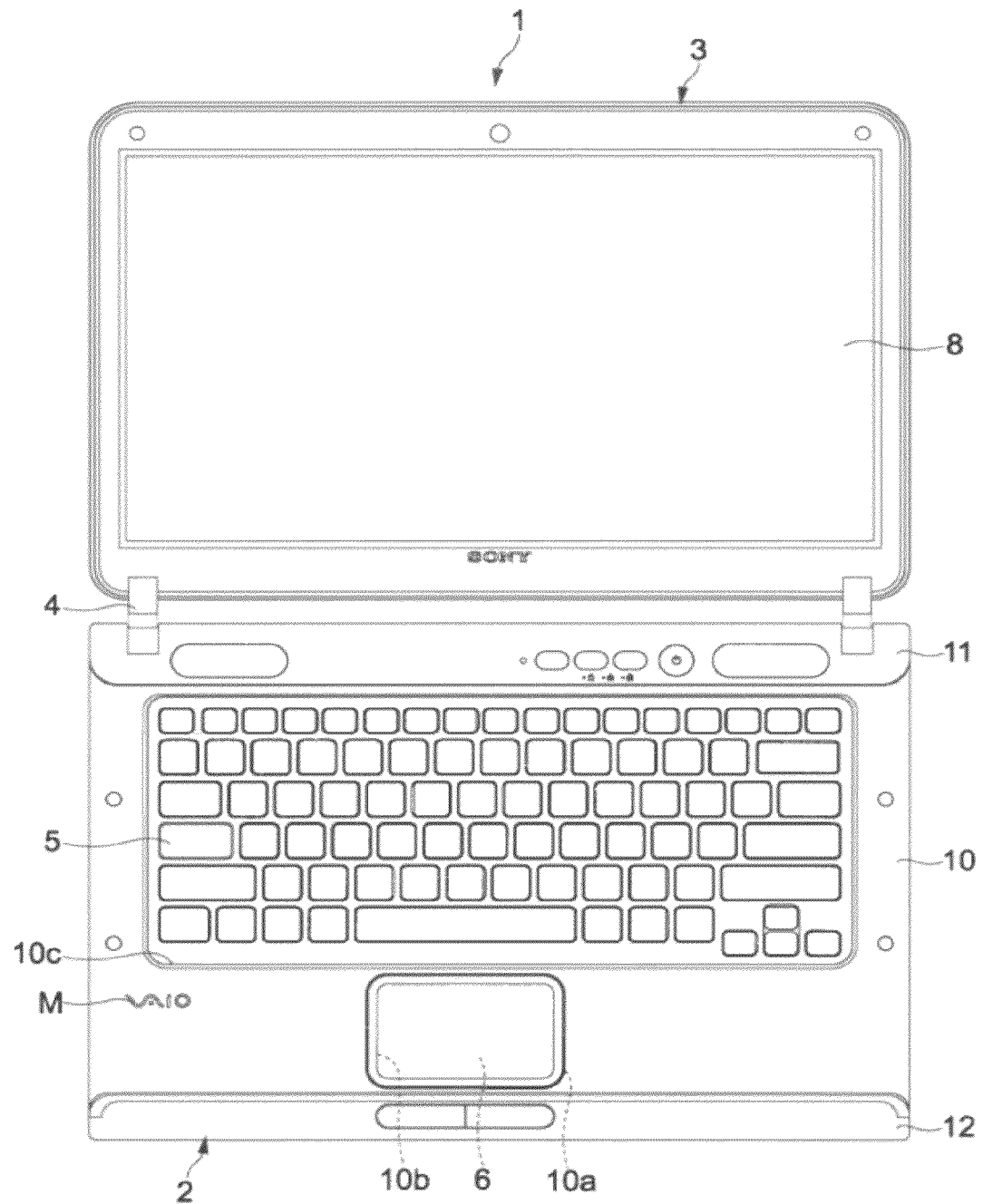
FIG. 3 is a plan view showing the opened state of the display unit of the PC according to the embodiment of the present disclosure.

FIG. 1 is a perspective view showing an opened state of a display unit of a PC according to an embodiment of the present disclosure. FIG. 2 is a perspective view showing a closed state of the display unit of the PC shown in FIG. 1. FIG. 3 is a plan view showing the opened state of the display unit of the PC. FIG. 3 shows the display unit and a main body unit in a state separated from each other. Further, FIGS. 4, 5, 6, 7, 8, and 9 are a back view, a front view, a right side view, a left side view, a plan view, and a bottom view, respectively, showing the closed state of the display unit of the PC.

As shown in those figures, a PC 1 includes a main body unit 2 and a display unit 3. The main body unit 2 and the display unit 3 are coupled to each other so as to be relatively rotatable by hinges 4.

On an upper surface of the main body unit 2, a keyboard 5, a touchpad 6, a power switch, other various types of switches, a status display unit, and the like are arranged. The keyboard 5 is a keyboard having a standard QWRTY key layout. The touchpad 6 is a user interface using a capacitive touch panel, for example. In the vicinity of the touchpad 6, two click buttons to which functions as a left button and a right button of a mouse are assigned are provided.

As shown in FIGS. 1, 2, 6, and 7, on side surfaces of the main body unit 2, various types of external connection terminals 2a, a disc slot 2b of a disc drive, a slot for a memory card/memory stick, and the like are provided. Examples of the external connection terminals 2a include a USB (Universal Serial Bus), an iLINK, a LAN (Local Area Network), an external display output, a video input, an audio input, an HDMI (High-Definition Multimedia Interface) output, a microphone input, and a headphone output.

Figure 4:
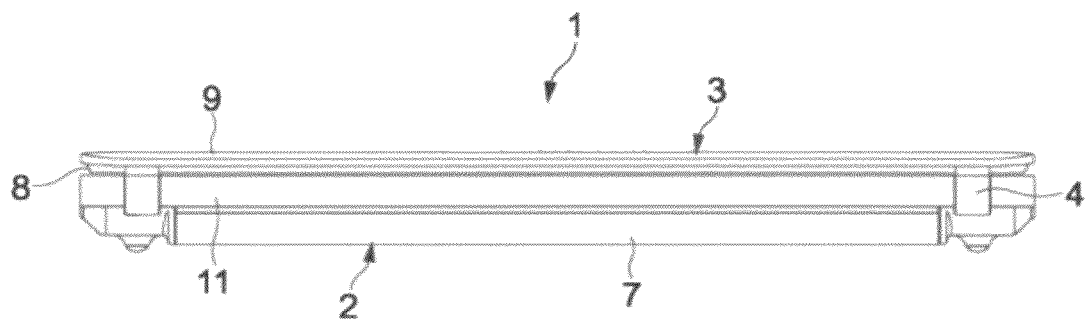
FIG. 4 is a back view showing the closed state of the display unit of the PC according to the embodiment of the present disclosure.
Figure 5:
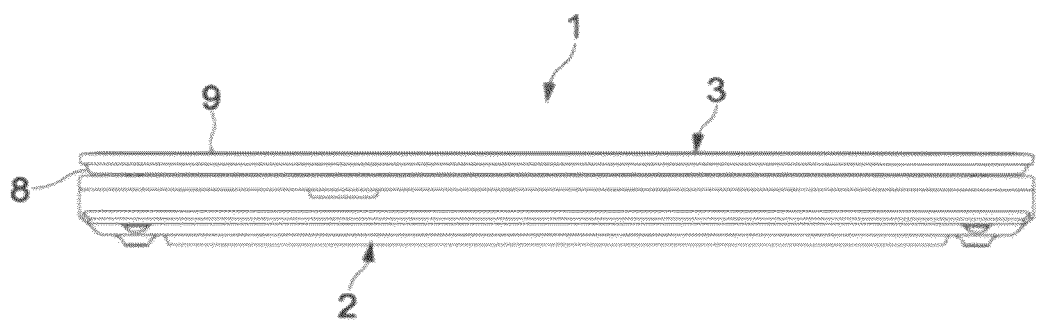
FIG. 5 is a front view showing the closed state of the display unit of the PC according to the embodiment of the present disclosure.
Figure 6:
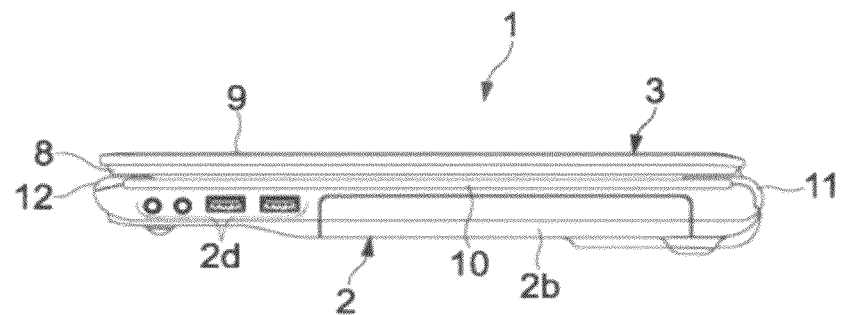
FIG. 6 is a right side view showing the closed state of the display unit of the PC according to the embodiment of the present disclosure.
Figure 7:
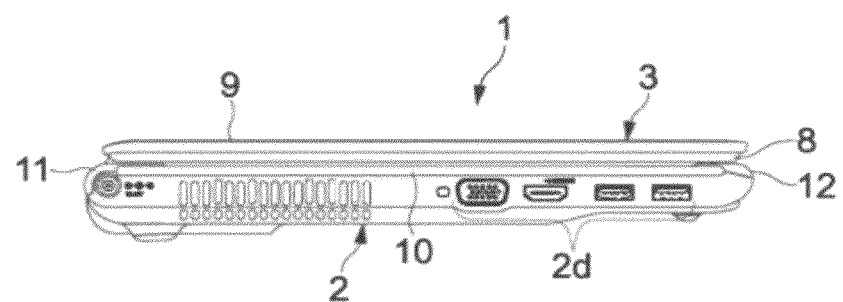
FIG. 7 is a left side view showing the closed state of the display unit of the PC according to the embodiment of the present disclosure.
Figure 9:
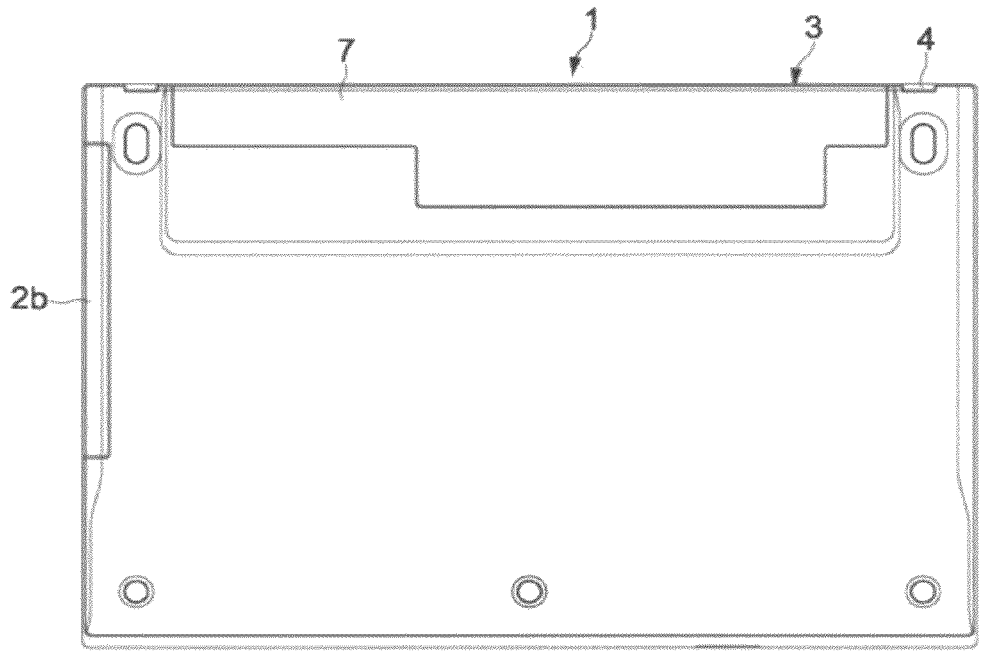
FIG. 9 is a bottom view showing the closed state of the display unit of the PC according to the embodiment of the present disclosure.

As shown in FIGS. 4 and 9, the main body unit 2 includes a battery 7 at an end portion of the bottom surface on the back side. The battery 7 is detachable from the main body unit 2. Inside the main body unit 2, various types of devices such as a mother board, an optical disc drive, a hard disc drive, a wireless communication device, an audio function, and a speaker/amplifier are provided. On the mother board, a main memory, a CPU, a graphics chip, a chip set, other electronic components such as a control circuit are mounted. The chip set is a chip for managing exchange of data among the devices inside the PC 1. The chip set includes a built-in graphics chip or the like. Further, the chip set includes an interface for connection with peripheral devices such as a nonvolatile memory and an EC (Embedded Controller).

The display unit 3 includes a display panel unit 8 constituted of an LCD (Liquid Crystal Display), for example. The display panel unit 8 includes a display module having a display screen. The display module is incorporated into the display unit 3 such that the display screen thereof is opposed to the upper surface of the main body unit 2 in the closed state of the display unit 3 of the PC 1 and faces to the front in the opened state of the display unit 3 of the PC 1. Further, in the closed state of the display unit 3 of the PC 1, the display unit 3 is used as a lid body of the upper surface of the main body unit 2. Therefore, on a surface of the display unit 3 that is opposite to the display screen (opposed surface), a top plate 9 as a decorative exterior unit is arranged. The top plate 9 is provided with logo marks M of a product name of the PC 1, a manufacturer name, and the like. The structure of the decorative exterior unit of the display unit 3 will be described later. The logo mark M is also provided to the upper surface of the main body unit 2.

[Structure of Display Unit]

Figure 8:
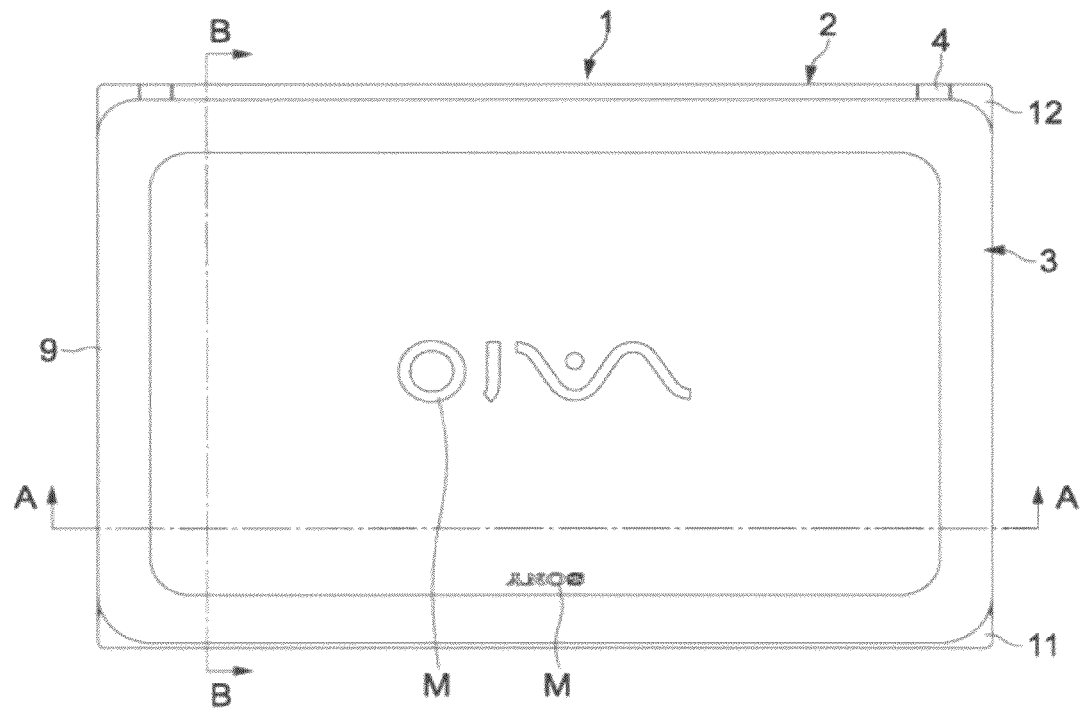
FIG. 8 is a plan view showing the closed state of the display unit of the PC according to the embodiment of the present disclosure.
Figure 10:
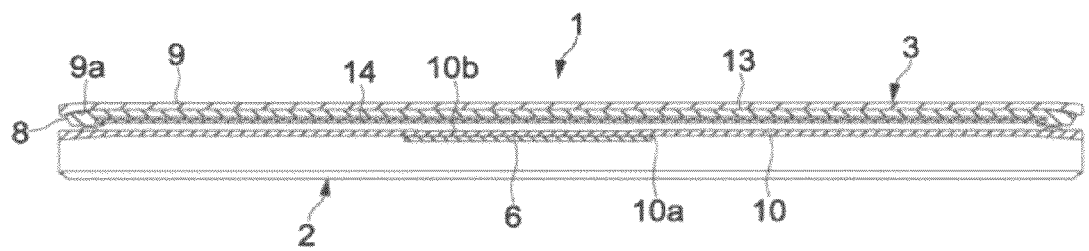
FIG. 10 is a schematic cross-sectional view taken along the line A-A in FIG. 8.
Figure 11:
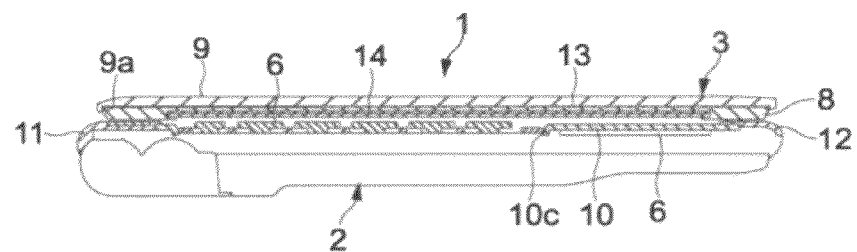
FIG. 11 is a schematic cross-sectional view taken along the line B-B in FIG. 8.
Figure 12:
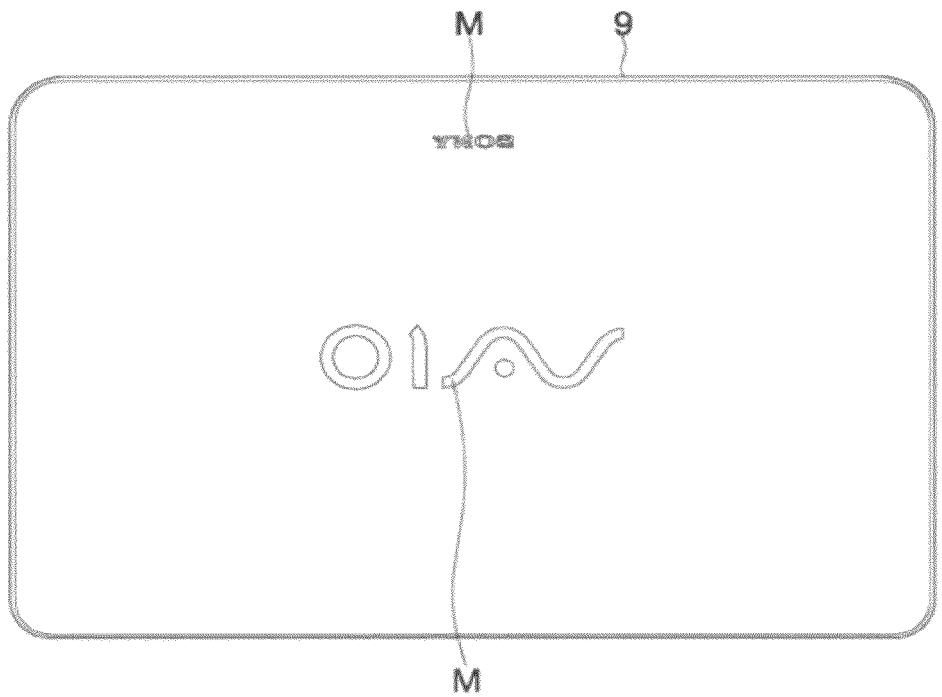
FIG. 12 is a bottom view showing a top plate of the PC according to the embodiment of the present disclosure.
Figure 13:
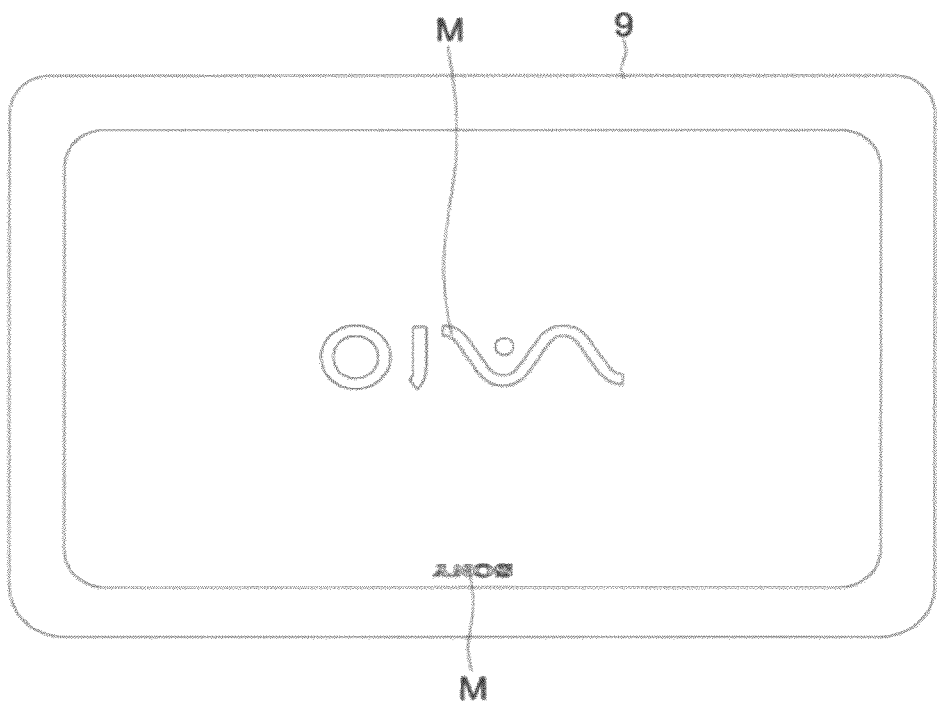
FIG. 13 is a plan view showing the top plate of the PC according to the embodiment of the present disclosure.

Next, the structure of the display unit 3 will be described. FIG. 10 is a schematic cross-sectional view taken along the line A-A in FIG. 8, and FIG. 11 is a schematic cross-sectional view taken along the line B-B in FIG. 8. Further, FIG. 12 is a bottom view showing the top plate 9 taken apart from the display unit 3, and FIG. 13 is a plan view showing the top plate 9 taken apart from the display unit 3.

As shown in FIGS. 4 to 7, 10, and 11, the display unit 3 includes the display panel unit 8 and the top plate 9. Into one surface of the display panel unit 8 (front surface), a display module 14 having a display screen is incorporated. To the other surface of the display panel unit 8 that is opposite to the display screen (rear surface), a protective sheet 13 for protecting the display panel unit 8 is attached.

To the rear surface of the display panel unit 8, via the protective sheet 13, one surface of the top plate 9 (rear surface) is attached fixedly. As shown in FIGS. 10 and 11, a concave portion 9a is provided to the rear surface of the top plate 9, and at least a part of the display panel unit 8 is accommodated in the concave portion 9a. Specifically, end portions of the top plate 9 on four sides are bent in the same direction so that the concave portion 9a described above is formed at a portion surrounded by those end portions. The thickness of an area corresponding to the concave portion 9a of the top plate 9 is substantially equal and front and rear surfaces thereof are flat surfaces. Further, the thickness of at least the left and right end portions of the top plate 9 is set so as to be gradually increased from the thickness of the area corresponding to the concave portion 9a.

Further, as shown in FIGS. 2, 8, 12, and 13, the top plate 9 is provided with logo marks M of, for example, a product name of this apparatus and a manufacturer name. Those logo marks M are formed as concave portions on the rear surface of the top plate 9. Here, a cross section of the concave portion representing the logo mark M is formed to be a right angle, for example, but it may have a semicircular, semielliptical, or other arciform cross-sectional configuration.

A film is attached to the front surface of the top plate 9. The film enhances the strength of the front surface of the top plate 9 and also has a decorative function. Specifically, a gradation pattern is printed on the film, in which, for example, a central part that occupies a great part of the film is transparent, and a certain width portion from the ends of the top plate 9 on the four sides is gradually changed to be semi-transparent and then opaque.

Further, on the protective sheet 13 interposed between the display panel unit 8 and the top plate 9, a color or decorative pattern to hide the rear surface of the display panel unit 8 and to be seen through the transparent portion of the top plate 9 is printed. As the decorative pattern, a 3D pattern to allow the top plate 9 to be sterically seen may be adopted. Specifically, the protective sheet 13 may be formed as a 3D sheet. It may be possible to prepare color variations and decorative pattern variations for the protective sheet 13 such that the protective sheet 13 can be exchanged with one corresponding to a user's preference.

(Material of Top Plate)

Next, the material of the top plate 9 will be described.

The top plate 9 is formed of a plastic light-collecting plate having transparency. The light-collecting plate contains a fluorescent dye having light-condensing property. As the plastic, for example, poly methyl methacrylate, polycarbonate, or polystyrene is used. Due to the fluorescent dye, the top plate 9 collects natural light or artificial light on the surface thereof. Due to excitation light such as ultraviolet rays included in the collected light, the fluorescent dye within the top plate 9 emits light, and major part of the emitted light is induced to end surfaces of the top plate 9 (side surfaces connecting the end portions of the front surface and the end portions of the rear surface) while undergoing total reflection within the top plate 9, and then output from the end surfaces in a condensed state. Accordingly, the end surfaces (side surfaces) of the top plate 9 on the four sides emit bright light. Further, an edge portion of the logo mark M provided as a concave portion on the rear surface of the top plate 9 also emits bright light by the induced light within the top plate 9 densely gathering at that concave portion, similarly to the end surfaces described above. Accordingly, a decoration effect is obtained in which a silhouette of the top plate 9 and the logo marks M are profiled by the bright light.

The top plate 9 is manufactured by, for example, insert molding (IMF), including the concave portions as the logo marks M described above. Specifically, the film is formed in advance in vacuum in accordance with the shape of the top plate 9. By setting the film in a mold for injection molding having the shapes of the top plate 9 and logo marks M, injecting a molten resin serving as a material of the top plate 9 into the mold, welding the film to the molten resin, and solidifying them, a top plate 9 integrally formed with the film is thus manufactured. Therefore, as compared to a seal or a printed logo mark in related art, it is possible to save costs for attachment of a seal or printing and effectively make the logo mark stand out due to the above-mentioned effect of the light by forming the logo mark as a concave portion.

In this manner, since a film is welded on the front surface of the top plate 9, the front surface has to be extremely flat. As described above, in this embodiment, the logo marks M are provided on the rear surface of the top plate 9 so as to cope with the problem.

[Structure of Main Body Unit]

Next, the structure of the exterior of the main body unit 2 will be described. As shown in FIGS. 1 and 3, the upper surface of the main body unit 2 (surface provided with the keyboard 5) is mainly covered with a deep-side plate 11, a near-side plate 12, a middle plate 10, and the like.

The deep-side plate 11 is an exterior unit including notch portions for securing movable areas for the hinges 4 and corresponding to an area where various types of switches such as a power switch are arranged. The near-side plate 12 is an exterior unit corresponding to a near portion where left and right click buttons attached to the touchpad 6 are arranged in the main body unit 2. The middle plate 10 is an exterior unit corresponding to a middle portion where the keyboard 5 and the touchpad 6 are arranged in the main body unit 2. Of those exterior plates, the middle plate 10 is formed of a plastic light-collecting plate having transparency as in the case of the top plate 9 described above. Therefore, as shown in FIGS. 1, 2, 6, and 7, end surfaces of the middle plate 10 that are exposed from the side surfaces of the PC 1 (side surfaces connecting the end portions of the front surface and the end portions of the rear surface) also emit bright light by the effect of light described above. Intending to obtain such an effect of light, the side surfaces of the middle plate 10 are designed to be exposed from the side surfaces of the main body unit 2. Further, the middle plate 10 is formed by injection molding, for example, including the logo marks M, as in the case of the top plate 9 described above.

The deep-side plate 11 and the near-side plate 12 are formed of a synthetic resin such as an AS resin or an ABS resin, as in the case of the bottom surface of the main body unit 2 and the exterior units of the respective side surfaces. The top plate 9 of the display unit 3 and the exterior units of the main body unit 2 have a common color.

Figure 14:
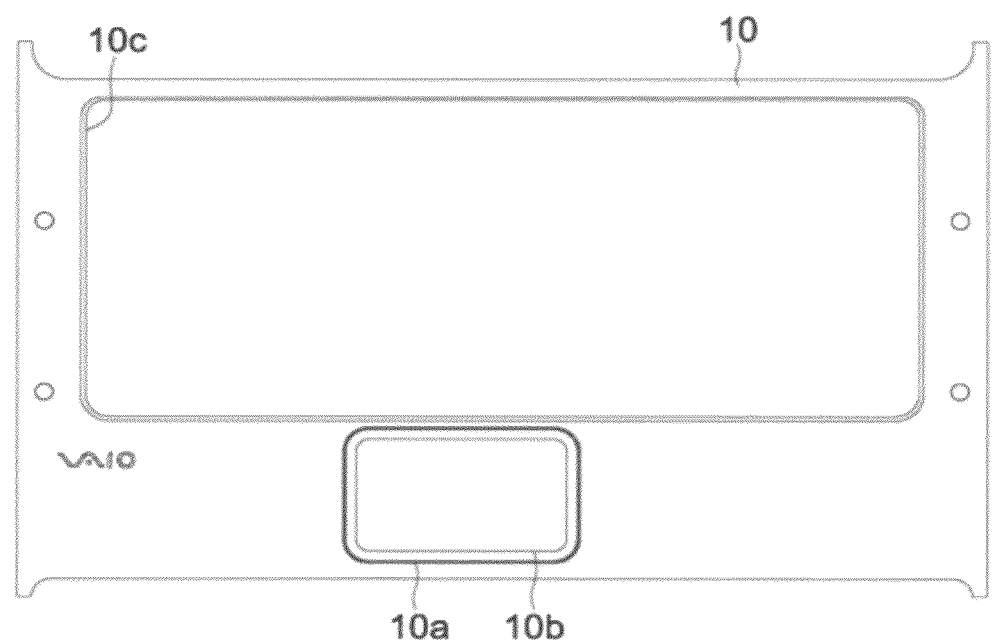
FIG. 14 is a plan view showing a middle plate of the PC according to the embodiment of the present disclosure.

FIG. 14 is a plan view showing the middle plate 10 formed of a plastic light-collecting plate. As shown in FIG. 14, the middle plate 10 has a rectangular hole 10c that passes through the front surface and rear surface of the middle plate 10 and exposes the keyboard 5.

As shown in FIG. 10, the thickness of the left and right end portions of the middle plate 10 are set so as to be gradually increased with respect to the thickness at the center thereof as in the case of the top plate 9 of the display unit 3. Specifically, the thickness of the middle plate 10 is set to be smaller as a distance from the end surface (side surface) becomes larger. With this structure, it is possible to improve design with use of light while securing setting positions of components located below the middle plate 10 within the main body unit 2.

As shown in FIG. 11, the thickness of an area between the left and right end portions of the middle plate 10 is substantially equal. It should be noted that an edge circumference of the hole 10c from which the keyboard 5 is exposed in the middle plate 10 is bent in a direction of the bottom surface of the main body unit 2 and uplifted. With this structure, the strength of the middle plate 10 particularly in the circumference of the hole 10c is improved. Further, the uplifted portion of the edge circumference of the hole 10c, that is, an inner surface of the hole 10c is to be an end surface that emit bright light by the induced light within the top plate 9 being condensed.

As shown in FIGS. 10 and 11, the rear surface of the middle plate 10 is provided with the touchpad 6 attached thereto using, for example, a double-sided tape or the like. As shown in FIGS. 10 and 14, the rear surface of the middle plate 10 is provided with a V-shaped groove 10a as a positioning mark of the touchpad 6. Specifically, the touchpad 6 is attached to the middle plate 10 while being aligned with a position of the V-shaped groove 10a of the middle plate 10 as a reference. Accordingly, since light is induced to end surfaces of the touchpad 6 and the V-shaped groove 10a described above and condensed, it is possible to achieve an effect in terms of decoration that causes the periphery of the touchpad 6 to emit bright light and an effect of improving operability by casing a user to visually identifying the position of the touchpad 6 immediately.

Further, as shown in FIGS. 10 and 14, a slightly concave portion 10b is formed on the front surface of the middle plate 10 in an area positioned slightly inner side of the position corresponding to the V-shaped groove 10a. The concave portion 10b is formed and accordingly the thickness of the middle plate 10 is adjusted so as to be a thickness at which the touchpad 6 can detect a capacitance. Further, at the periphery of the concave portion 10b, end surfaces are slightly formed in a direction substantially perpendicular to the direction in which light is induced within the middle plate 10. Therefore, it is possible for the user to visually identify the position of the touchpad 6 by the end surfaces in the periphery of the concave portion 10b emitting bright light.

[Visual Effect of Exterior]

Figure 15:
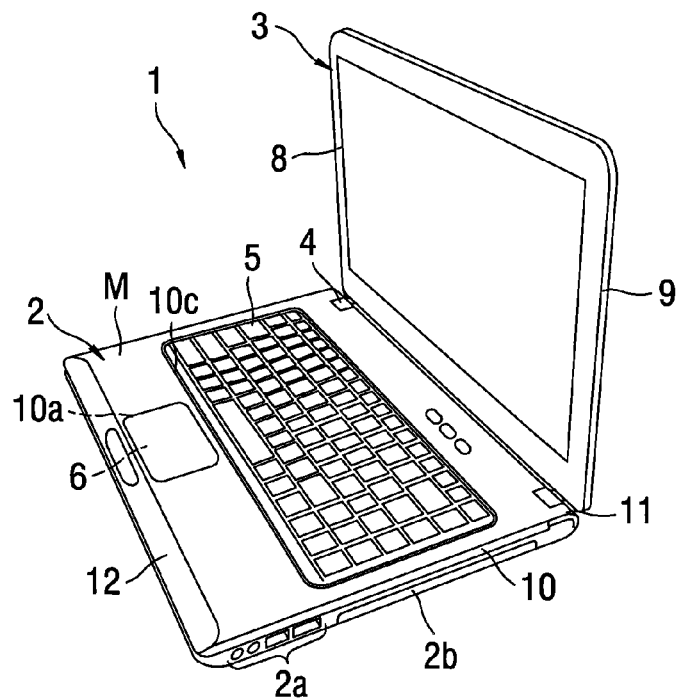
FIG. 15 is a perspective view of the opened state of the display unit of the PC according to the embodiment of the present disclosure, which is obliquely taken from a right direction.
Figure 16:
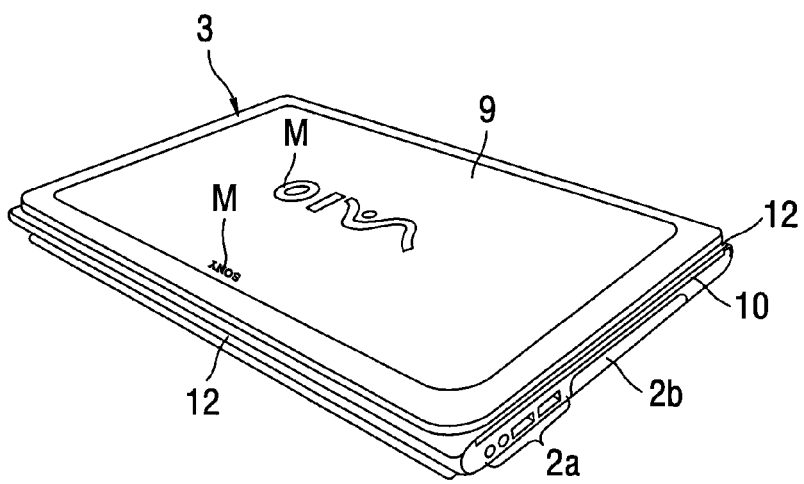
FIG. 16 is a perspective view of the closed state of the display unit of the PC according to the embodiment of the present disclosure, which is obliquely taken from a right direction.
Figure 17:
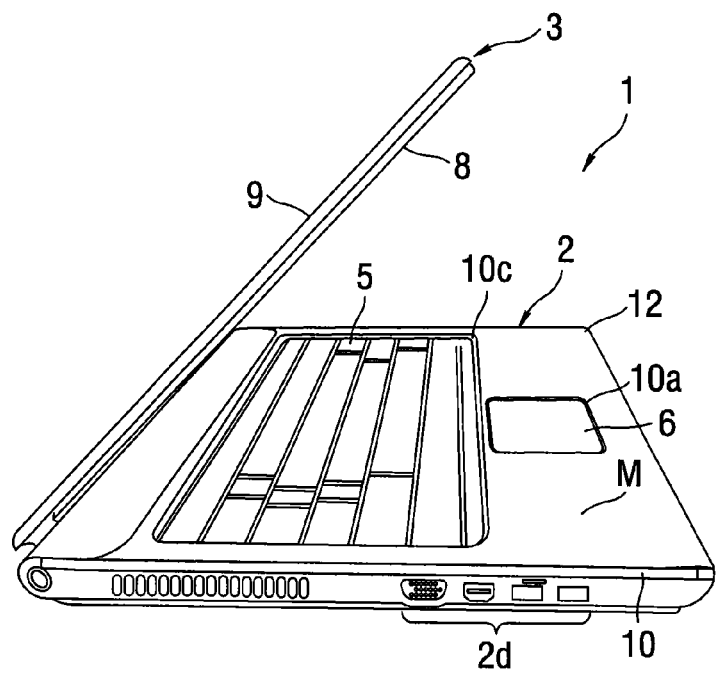
FIG. 17 is a side view of the opened state of the display unit of the PC according to the embodiment of the present disclosure, which is taken from a left side direction.
Figure 18:
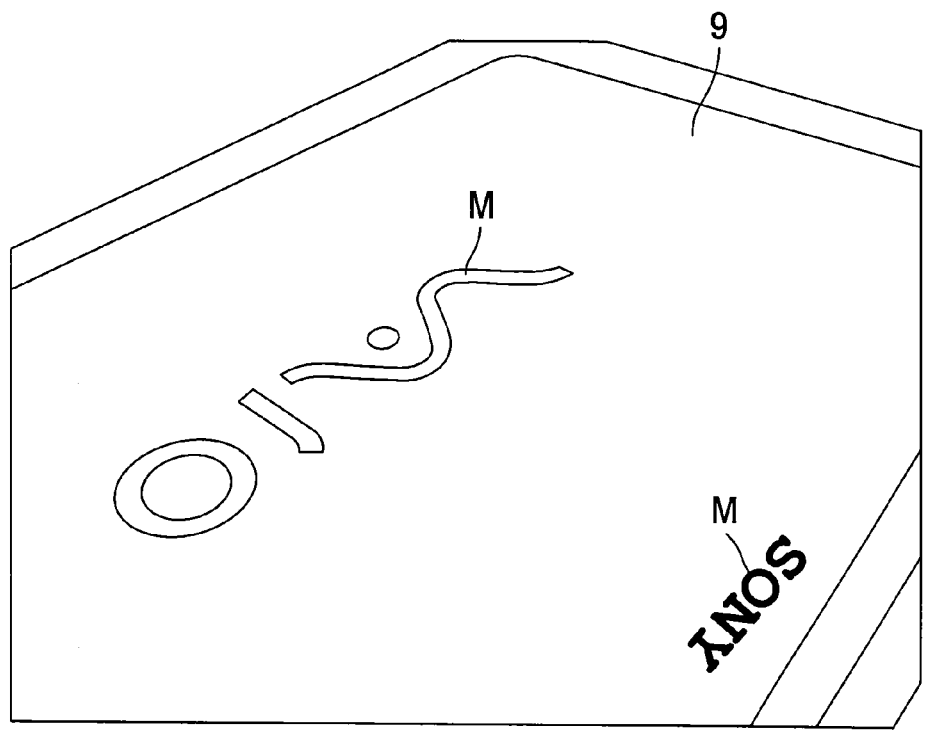
FIG. 18 is a perspective view of logo marks and the vicinity thereof on the top plate of the PC according to the embodiment of the present disclosure.

FIG. 15 illutrates a perspective view of an opened state of the display unit 3 of the PC 1, which is obliquely taken from a right direction. FIG. 16 illutrates a perspective view of a closed state of the display unit 3 of the PC 1, which is obliquely taken from the right direction. FIG. 17 illustrates a side view of the opened state of the display unit 3 of the PC 1, which is taken from a left side direction, and FIG. 18 illustrates a perspective view of logo marks M and the vicinity thereof on the top plate 9 of the PC 1.

As shown in those figures, by adopting a plastic plate containing a fluorescent dye having light-condensing property as the top plate 9 and the middle plate 10, the end surfaces of the top plate 9 and the middle plate 10 emit bright light, and by forming a logo mark M as a concave portion on the top plate 9 and attaching the touchpad 6 to the rear surface of the middle plate 10, the periphery of the logo mark M and touchpad 6 emit bright light, which contributes to the improvement of the design of the PC 1.

[Conclusion]

According to the embodiment described above, a plastic plate containing a fluorescent dye having light-condensing property is used as the exterior members of the main body unit 2 and the display unit 3 of the PC 1, with the result that the designability of the PC 1 can be improved using light without increasing the number of steps in manufacturing or the number of components.

Further, in the display unit 3, the concave portions indicating the logo marks M are formed on the rear surface of top plate 9 containing a fluorescent dye having light-condensing property, with the result that the logo marks can be made to stand out while reducing costs, as compared to a logo mark obtained by attachment of a seal or printing in related art.

Further, in the main body unit 2, the touchpad 6 is attached to the rear surface of the middle plate 10 containing the fluorescent dye having light-condensing property, with the result that it is possible not only to improve designability, but also for user to visually identify the position of the touchpad 6 immediately.

Further, in this embodiment, the light-collecting plate is adopted in equipment having a relatively large shape on a top plate or an arrangement surface of a keyboard, such as a laptop PC, with the result that it is possible to ensure a sufficient amount of light induced to end surfaces thereof and effectively cause the end surfaces to emit light.

[Modified Example]

In the embodiment described above, the logo marks M as concave portions of the top plate 9 are provided by injection molding, but may be provided by other methods such as engraving. Further, although the logo marks M are provided on the rear surface of the top plate 9, instead of or in addition to this, the logo marks M may be provided on the front surface of the top plate 9. Further, instead of the logo marks M, various character strings or decorative patterns may be provided as concave portions. By providing a logo mark or other designs as concave portions on both the front surface and rear surface of the top plate 9, it is possible to differentiate between the front surface and the rear surface in visual performance, thus providing a more complicated and attractive design.

In the embodiment described above, a laptop PC is exemplified as the information processing apparatus. However, the present disclosure is applicable to, for example, a tablet PC, a portable information terminal, a mobile phone, a smartphone, a portable game console, an electronic dictionary, and an electronic book terminal, a portable audio/video player, a car navigation apparatus, and other information processing apparatuses. In this case, the information processing apparatus may not be provided with a keyboard.

The present disclosure contains subject matter related to that disclosed in Japanese Priority Patent Application JP 2010-170113 filed in the Japan Patent Office on Jul. 29, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a display panel having a front surface and a rear surface opposed to the front surface, the display panel further including a display screen positioned on the front surface;
   a protective sheet in contact with the rear surface of the display panel so that the rear surface of the display panel is between the protective sheet and the front surface of the display panel; and
   a top plate that is fixedly attached to the display panel, the top plate having a first surface that is in contact with the protective sheet, a second surface that is opposed to the first surface, and an edge surface that connects an end portion of the first surface and an end portion of the second surface, the top plate containing a fluorescent dye to collect ambient light toward the edge surface, wherein
   a portion of the display panel is accommodated within the edge surface of the top plate,
   the protective sheet is between the top plate and the display panel, and
   the protective sheet prevents all light from passing from the display panel to the top plate.

2. The information processing apparatus according to claim 1, wherein
the top plate includes a first concave mark section representing a first mark on the second surface.

3. The information processing apparatus according to claim 2, wherein
the top plate includes a second concave mark section representing a second mark on the second surface.

4. The information processing apparatus according to claim 2, wherein
the first mark contains the fluorescent dye, and
the ambient light is further collected toward an end portion of the first mark.

5. The information processing apparatus according to claim 4, wherein the first mark is illuminated by the fluorescent dye.

* * * * *